United States Patent Office 3,075,883
Patented Jan. 29, 1963

3,075,883
NOVEL PARENTERAL VACCINE ANTIGEN COMPOSITIONS AND METHODS OF MAKING AND USING
George H. Scherr and Abraham S. Markowitz, Park Forest, Ill., assignors to Consolidated Laboratories, Inc., Chicago Heights, Ill., a corporation of Illinois
No Drawing. Filed Nov. 8, 1961, Ser. No. 150,892
30 Claims. (Cl. 167—78)

The present invention relates to novel vaccine and antigen, including anti-allergy, compositions, methods of making the same, and methods of using the same in the treatment of living animals by parenteral injection thereof into the body of the living animal. More particularly, the invention relates to such vaccine or antigen compositions containing a soluble non-toxic salt of alginic acid having particular characteristics, in which compositions the alginate acts as an adjuvant causing a remarkable increase in production of antibodies upon parenteral injection of the composition into the living animal body.

The compositions of the present invention are adapted for use and may be used for intramuscular, subcutaneous, and intradermal (intracutaneous) administration, but not intravenous or intraperitoneal administration. The terms "vaccine" and "antigen," as recognized by the art, are not necessarily mutually exclusive and not necessarily synonymous, although for many purposes they have the same meaning. In any event, both give rise to production of antibodies upon injection and the present invention is equally applicable to both. The invention is moreover equally applicable to soluble or nonparticulate vaccines or antigens and insoluble or particulate vaccines or antigens, although for purely physical reasons the exact modus operandi selected may be somewhat different when employing the non-particulate as opposed to particulate vaccines or antigens.

The present invention is not only of the greatest importance to the public health as filling a long-felt want, but in fact it allows the attainment of results which have hitherto not even been imagined to be capable of attainment throughout the long period of development of vaccines and antigens and therapy therewith, although over this entire period of development the importance of and need for improving their effectiveness, increasing antibody titer attainable upon a single administration, and reducing the number of administrations necessary for maintenance of effective antibody titers throughout the period in which they are deemed medically necessary or desirable, have all been fully recognized. The dramatic quality of the results of the present invention is emphasized by the many unsuccessful past attempts to accomplish such results, which are fully documented in the literature.

Historically, it has long been known that injection of certain substances or antigens into an animal including a human body may elicit the formation of materials, usually called antibodies, which can react with said substance or antigen in a demonstrable reaction such as in a test tube, on a slide, or in vivo. These phenomena and reaction between antigen and antibody are well known in the medical and biological professions and have been discussed in such texts and publications as Landsteiner and Carpenter (Lansteiner, Karl, The Specificity of Serological Reactions, Harvard University Press, Cambridge, Mass., 1947; Carpenter, Philip L., Immunology and Serology, W. B. Saunders Co., Philadelphia, 1956).

Antigens in the form of particles, such as present in vaccines of bacteria and viruses, usually elicit a higher antibody titer when injected intravenously as compared to other routes. Provided that the same amounts of antigen are used, soluble antigens will usually elicit a higher antibody response when injected into the tissues, e.g., intramuscularly, than when injected intravenously. It is also usually desirable in immunization and vaccination procedures to inject into the tissues because there is generally less risk of provoking an anaphylactic response by tissue injection than by multiple intravenous injections. This is consistent with the established view that an intravenous injection in a sensitized patient is usually the route most likely to precipitate anaphylactic shock. Additionally, intravenous injections frequently carry a greater attendant risk of microbial entrance and emboli.

Various schedules of inoculation with antigen will also influence the degree to which antibody is produced. If the intravenous route of injection is employed, there is the well known necessity of repeated antigenic introduction over an extended period, usually several injections a week for many weeks. This necessity is known both for particulate and soluble antigens. Because of the inherent risks of intravenous inoculations cited previously and the danger of collapsing available veins, other routes have been employed. For example, the intraperitoneal route has been used in humans in the case of the Pasteur treatment for rabies. Such a heroic method, however, is extremely dangerous and has never been employed widely. Even introduction into the tissues, e.g., intramuscularly, or soluble or particulate antigens and vaccines by themselves usually requires a prolonged, repetitive series of injections. For the foregoing reasons, various approaches have been taken in an attempt to enhance or heighten the antibody response provided upon tissue introduction of the antigen, e.g., intramuscularly, intracutaneously, or subcutaneously, so as to be able to reduce the total number of injections required.

Along these lines, it has been demonstrated that certain substances, when used as an adjuvant acting as the suspending vehicle for the antigen, will serve to effect a general increase in the antibody titer over that which would ordinarily be attained without the use of the adjuvant. Such adjuvants have been used to elicit a higher antibody response for various antigens in the field of vaccination against infectious disease agents, to elicit antibodies against various toxins, and to elicit protective antibodies against offending antigens or atopens in the allergic or hypersensitive states.

Among the agents which have been employed as such adjuvants, alum is one of the most widely used, as in diphtheria toxoid or bacterial vaccines such as *H. pertussis*. Other agents which have been used as adjuvants include aluminum hydroxide, fats, lanolin in oil, cholesterol, calcium and magnesium salts, bacterial products such as typhoid vaccine (Ramon et al.) and staphyloccal toxin (Burkyl), tubercle bacilli (Freund et al.), and heterophile antibody serums (Kalinen et al.), and even tapioca (Ramon). The most commonly used adjuvants are oil-in-water emulsions and alum-type adjuvants. Both of these materials have been and are now being used as adjuvants in human immunization by the introduction of antigens. Neither substance is in wide use, however, primarily because each is restricted by its own particular drawbacks. For example, published reports indicate that oil-in-water emulsions of antigens and vaccines have a tendency to incite nodules, sterile abscesses and other cutaneous responses. Alum, too, has been reported as contributory to such manifestations, whereas the Freund adjuvant (containing tubercle bacilli), which is by far the most effective in increasing antibody titer of all adjuvants reported to date, is not employed due to potential carcinogenic implications and because of the loss of diagnostic significance of the tuberculin test which would follow.

The mode of action whereby adjuvants for vaccines enhance and prolong antibody production is not clearly established. Many hypotheses have been proposed such as (a) protection of the antigen against destruction by enzymes or other body responses, (b) the slow, continuous release of the antigen from the site of innoculation as by depot effect or stimulation of tissue lesions, or (c) the type of cellular response evoked by the adjuvant itself or by a co-acting antigen. In this regard, it is interesting to note that the adjuvant effect of both alum and tapioca has been attributed by leading investigators to the same adjuvant mechanism. (See Topley and Wilson, Principles of Bacteriology and Immunity, third edition, volume II, 1114 et seq., chapter entitled "The Enhancement of Response to an Antigenic Stimulus," Williams and Wilkins, 1946.)

Since the development of various salts of alginic acid at least fifteen years ago, several reports have appeared describing their possible use as adjuvants. One of the principal characteristics of a solution of sodium alginate is that, in the presence of a suitable concentration of calcium ions, a precipitate of calcium alginate gel occurs, which can be gradually absorbed by body fluids and tissues (Blaine, George, Experimental Observations on Absorbable Alginate Products in Surgery, Annals of Surgery 125, No. 1, 102–114, 1946). It was therefore of interest to Amies (Amies, C. R., The Use of Topically Formed Calcium Alginate as a Depot Substance in Active Immunisation, The Journal of Pathology and Bacteriology 77, No. 2, 435–442, 1959), to use a solution of sodium alginate as a suspending vehicle for an antigen, vaccine, or similar substance. Such an adjuvant, when introduced into the body will, either following introduction of a calcium salt or in the presence of a sufficient concentration of calcium ions normally present in the tissues, precipitate in the form of a gel-like depot.

Using sodium alginate as a suspending adjuvant for diphtheria toxoid, Amies reported an increased antibody titer in experimental animals when compared to controls injected with the diphtheria toxoid in saline and no adjuvant. However, the alginate adjuvant did not result in any increase in antitoxin response in experimental animals when compared with controls injected with the toxoid suspended in aluminum phosphate (alum) adjuvant; in fact, the alginate results showed it to be approximately half as potent an adjuvant as the alum. It is clear that Amies was able to demonstrate only inferiority of his alginate adjuvant when compared with alum using diphtheria toxoid, the one case in which a comparison was possible. With other antigens, his results were so equivocal that they were not published. Since publication of Amies' work, there has been no art acceptance of any alginate adjuvant, because of Amies' inability to demonstrate any purpose for employing the alginate adjuvant which be studied. Moreover, Slavin, D., reporting in Nature 165, 115 (1950), failed to elicit a satisfactory antibody response upon a single injection of a sodium alginate adjuvanted bacterial vaccine intraperitoneally and concluded that the animals "showed unsatisfactory antibody response."

It has now been found that important and critical differences exist between various alginate molecules, and that these important and critical differences not only give rise to important physical differences which characterize the alginate molecules themselves and solutions thereof, but that these differences moreover may be exploited to great advantage.

As one characteristic difference may be mentioned the fact that, whereas Amies found it necessary to dilute his sodium alginate to a one percent weight/volume solution for passage through a 24 gauge needle, the solutions of sodium alginate employed according to the present invention are free flowing and readily pass a 24 gauge needle at concentrations of five percent weight/volume or even higher.

The sodium alginate solutions available at the time of Amies' reported work and employed by the present applicants are distinguished not only by the great viscosity difference, but by other physical and chemical differences which indicate an important difference in kind. On a Fiske osmometer, for example, the alginates used in the present invention exhibit a milliosmolarity less than 150, and preferably between 100 and 125, while previously available alginates exhibit much higher milliosmolarities. Still other physical and chemical differences accompany those enumerated in the foregoing and are correlated with basic differences in structure which exist between the alginates employed in this invention and those available previously.

While the extent of these basic differences is not fully known or understood, enough is known to be able to say with certainty that the materials are strikingly different in various ways and, according to the present invention, also in the results attendant upon their use.

The soluble alginate, e.g., sodium alginate, employed according to this invention has the following characteristics:

(a) In 5% weight/volume aqueous solution, readily passes a 24 gauge needle.
(b) In 4% weight-volume aqueous solution, has a viscosity less than 50, generally less than 30, and preferably 20 or less centistokes.
(c) pH in 4% solution may vary widely but is usually between 7.0 and 7.8, preferably between 7.2 and 7.6.
(d) A chemical equivalence below 250, usually below 225 and preferably between about 188 and 220.
(e) A milliosmolarity less than 150 per kg. of water on a Fiske osmometer, preferably between 100 and 125.
(f) Trace elements and other cations in physiologically acceptable quantities.

It is accordingly an object of the present invention to provide novel vaccine and antigen compositions embodying a soluble alginate adjuvant, having the aforesaid novel characteristics, which compositions are useful in intramuscular, intradermal, or subcutaneous administration to produce antibody titers which are greatly enhanced over those produced by the same vaccine or antigen in the absence of said adjuvant. Another object of the invention is to provide a novel method of making such vaccine and antigen compositions, and an additional object is to provide a method of administering vaccines and antigens to a living animal body in compositions embodying such adjuvants. Further objects will be apparent to one skilled in the art to which the invention pertains, and still other objects of the invention will become apparent hereinafter.

The prior art is replete with references to alginic acid and alginates and methods for their preparation and refinement, starting with the hydrolysis of seaweed. Acid hydrolysis of alginic acid has the effect of modifying the molecule by degrading the polymer chain thereof. The starting alginate used in the present invention is believed to be of relatively short average chain length and is produced by acid hydrolysis of alginic acid of usual chain lengths and subsequent conversion to the desired alginate salt, which at the reduced chain length has the aforedescribed prerequisite characteristics. Other procedures and sequences of degrading the alginic acid polymer chain and/or producing the alginates having the stated characteristics from normally available alginic acid and alginates are available and may used. Additionally, various methods of separating and fractionating alginic acid and alginate products of relatively short average chain length from other similar products may be utilized, so long as the alginate product of the prescribed characteristics is finally produced. The alginate product is then placed in solution in conventional manner. Suitable alginate solution of four percent weight/volume concentration, having the necessary characteristics, is now commercially available from Medical Alginates, Ltd., Wadsworth Road, Perivale, Middlesex, England.

As a typical preparation of suitable starting alginate solution, four kilograms of the selected sodium or other soluble alginate in powder form may be added to 100 liters of pyrogen-free distilled water, the mixture mechanically agitated, and 1.5 kilograms of decolorizing charcoal added. After allowing the mixture to stand for a period of five days or so in a sterile atmosphere, a sample is withdrawn and checked against acceptable standards. The characteristics are adjusted if not within established tolerances. The adjusted solution is filtered to remove decolorizing charcoal and then through a bacteriological filter, dispensed into appropriate containers and sterilized in an autoclave at a suitable temperature and pressure, as at fifteen pounds per square inch for fifteen minutes. The product is a transparent, sterile, pyrogen-free solution, suitable for use as a vaccine and antigen adjuvant.

In the following reported examples, a 4% weight/volume sodium alginate solution was used. This sodium alginate had the following characteristics:

(a) 4% solution readily passes a 24 gauge needle; (b) 4% solution has viscosity of 20 centistokes or less; (c) pH of 4% solution between 7.2 and 7.6; (d) chemical equivalence between 188 and 220; (e) milliosmolarity on Fiske osmometer of about 111.5; (f) on a Beckman DK–2 recording spectrophotometer, shows no absorption peaks in the range of 1000 to 400 m$\mu$ and only a negligible absorption at or near 270 m$\mu$ in the 200 to 400 m$\mu$ range (previously available sodium alginates show a pronounced absorption peak at or about 270 m$\mu$); (g) trace elements in physiologically acceptable quantities (lead <1 p.p.m., copper 1 p.p.m., arsenic zero) and physiologically acceptable quantities of other cations (Na$^+$ 161 meq., Ca$^{++}$ 8.6 meq.). Dilution or concentration of the solution within the ranges of 1 to 5% does not change its acceptability or eliminate the advantageous result of its use, although solutions of 2% or greater, and especially about 4% solutions, are preferred.

The successful preparation of an alginate adjuvanted antigen or vaccine composition requires a prior understanding that the depot effect is obtained by conversion of the sodium alginate (soluble state) to the calcium alginate (gel state). Hence at least the calcium, and preferably both the sodium and calcium, concentration of the antigen or vaccine solution or suspension should be known.

The precipitation of the alginate adjuvant containing an antigen or vaccine is due to calcium or other insolubilizing ions normally present in the tissues or which are added into the injection site prior to, after, or concurrently with introduction of the alginate-containing vaccine or antigen, or which are already present in the adjuvanted vaccine or antigen preparation but have been sequestered.

It is therefore clear that the vaccine or antigen preparation added to the soluble, e.g., sodium, alginate should not contain insolubilizing, e.g., calcium, ions of a concentration sufficient to precipitate as the insoluble alginate gel before injection can be made. Since different vaccines and antigens require preparation by diverse methods, the concentration of the most likely to be present calcium ions in such antigenic preparations should be determined in each case.

If the concentration of sodium or other solubilizing ions present in the vaccine or antigen is too high, then the alginate adjuvanated composition may not readily depot upon injection due to competition between the calcium or other insolubilizing ions available in the tissues and the excess sodium or other solubilizing ions present in the alginate adjuvanated composition if no sequestered calcium or other insolubilizing ions are present and no further insolubilizing ions are to be provided at the injection site.

As previously stated, different vaccines and antigens require preparation by diverse methods, and the concentration of sodium ions present in such antigenic preparations is also preferably determined in each case.

Calcium or other insolubilizing ions in a sequestered state may also be added to the alginate-adjuvanted vaccine or antigen composition without causing precipitation of insoluble alginate. As the sequestering agent is split by body mechanisms at the injection site, injection of such compositions into the tissues results in a disassociation of the sequestered calcium or other alginate insolubilizing and precipitating ions, making them freely available for depoting in situ of an insoluble alginate gel.

The calcium and sodium ion concentrations in the 4% alginate solutions used in the reported examples, as determined by flame photometry, were 8.6 and 161 milliequivalents, respectively.

It was alsot found, for example (Example 2), that a concentration of 75 milliequivalents of sodium ion present in the vaccine of S. typhosa there used was not sufficient to interfere with the effectiveness of a calcium chloride solution, containing as much as 100 milliequivalents of calcium ions, in the precipitation of calcium alginate.

The preparation of the soluble alginate adjuvanted vaccine or antigen compositions of the invention is accomplished by admixture of the alginate or alginate solution with the appropriate antigen or vaccine solution or suspension and bringing the pH of the composition to a physiologically acceptable level, e.g., 7–7.8, and the various ingredients of the composition to predetermined concentrations. Preservative may be incorporated at this or any other suitable point in the process. However, during this admixture, it is necessary to maintain the concentration of unsequestered alginate insolubilizing ions, such as calcium, which is most likely to be naturally present in the alginate or alginate solution, below that concentration which will precipitate out the insoluble alginate gel before the composition can be packaged and injected. The amount of calcium or other insolubilizing ions present may be readily determined by titration. Maintenance of the concentration of unsequestered alginate insolubilizing ions below the precipitation end point is necessary whether, in injecting the composition, insolubilizing ions naturally indigenous to or added to the injection site are to be relied upon for the in situ depoting or whether splitting of sequestered insolubilizing ions already present in the composition at the injection site is to be relied upon for this phenomenon, as the formation of sufficient insoluble gel at this stage frustrates attainment of the advantages of the invention. Should some gel form, this can be eliminated by filtration or homogenized, but a clear gel free product is by far preferable for obvious reasons. The concentration of alginate solubilizing ions, e.g., sodium, in the composition must also be considered, quite aside from the necessity of physiological acceptability of the total ion content of the composition, whether it is desired to rely upon the concentration of insolubilizing ions naturally present or added at the injection site or in sequestered form, since the relative amounts of these insolubilizing and solubilizing ions, in competitive reaction for available alginic acid, will determine whether or not sufficient insolubilizing ion is present to cause the desired depot formation upon injection. These determinations of solubilizing and insolubilizing ion concentrations are easily made, however, and present no obstacle to one skilled in the art. It is simply necessary to provide inadequate unsequestered insolubilizing ion concentration during preparation of the vaccine to cause precipitation of the insoluble alginate at that point, and conversely to provide sufficient unsequestered insolubilizing ion concentration at the site of the injection to cause formation of the insoluble alginate potentiating depot upon injection.

Non-toxic soluble alginic acid salts which may be used in lieu of the sodium alginate, provided that the necessary characteristics of the alginate are maintained, include potassium alginate and ammonium alginate and like soluble salts of alginic acid with non-toxic cations.

Other non-toxic insoluble alginate salts may be produced in situ in lieu of calcium alginate. These include the alkaline earth metal salts other than calcium, e.g., the magnesium, barium, and strontium salts. They may be injected in the form of their organic or inorganic salts. Salts in the form of which these metallic cations may be provided include chlorides, carbonates, lactates, citrates, gluconates, acetates, propionates, and the like. Such materials may be generically referred to as physiologically acceptable alginate precipitants. They may be injected into the animal body at or in the area of the site of injection or proposed injection of the alginate adjuvanted vaccine or antigen composition either before, after, or simultaneously therewith, in the form of a sterile non-pyrogenic solution or suspension in order to precipitate the insoluble alginate salt in situ in the animal body. Alternatively the insolubilizing cation may be present in the antigen or vaccine composition itself if complexed or sequestered by a suitable agent which is stable in the vaccine or antigen composition but which is split by enzymes or other body mechanism upon injection, thereby releasing the insolubilizing cation in situ to create the desired insoluble alginate vaccine or antigen potentiating depot.

Among preservatives which can if desired be employed in conventional concentrations in the compositions of the invention may be mentioned the parabens (para-aminobenzoic acid esters) such as methyl paraben, hexahydric alcohols such as sorbitol, mannitol, inositol, or dulcitol, or phenols such as phenol, cresol, chlorocresol, or chlorohexol, formaldehyde, mercurials such as merthiolate, and the like. Antibiotics or antifungals may also be incorporated where their presence does not interfere with the primary activity of the vaccine or antigen composition. Any preservative used should be physiologically acceptable.

Employment of the compositions of the invention is by parenteral injection intramuscularly, intradermally, or subcutaneously. This is true whether the active material of the vaccine or antigen composition is particulate or non-particulate in form. As indicated herein, especially by the examples, when the active vaccine or antigen principle is particulate, simple injection of the adjuvanted vaccine or antigen composition into the living animal body is ordinarily sufficient to provide desired unprecedented antibody titers. Employment of added alginate insolubilizing ions (not present naturally at the site of injection), whether by providing added sequestered ions in the composition for splitting by the body or by providing added unsequestered alginate insolubilizing ions at the site of injection in some other manner, serves only to enhance still further the effect of the basic composition in producing the desired high antibody titers.

Where the active material of the vaccine or antigen composition is non-particulate, however, a different situation prevails. Although the adjuvanted non-particulate vaccine or antigen compositions of the invention are novel and the adjuvanting alginates importantly different from known alginates previously used as adjuvants, the increase in antibody titer attainable with thus-adjuvanted non-particulate vaccine or antigen compositions of the invention, without providing additional alginate insolubilizing ions over the concentration naturally available in the body at the injection site, is not outstanding. However, when these non-particulate compositions contain added alginate insolubilizing ions, such as calcium, in squestered form for splitting by the body at the site of the injection, or added alginate insolubilizing ions are provided at the site of injection in any other manner, the results are again most gratifying and antibody titers thus produced are again outstanding when compared with those attainable using normally employed adjuvants.

Thus, a summation of the protocols hereby disclosed for treating a living animal body with the compositions of the invention is as follows:

| Type of vaccine or antibody active principle | Mode of treatment by injection | Added Alginate Insolubilizing Ions at situs of injection [1] |
|---|---|---|
| Particulate | IM, ID, SQ | Not ordinarily required; outstanding antibody titers without, but still further enhancement with, added insolubilizing ions. |
| Non-particulate | IM, ID, SQ | Ordinarily required for outstanding antibody titers. |

[1] Whether by sequestering and splitting, or by injection at site prior to, after, or concurrently with injection of vaccine or antigen composition.

Additional detailed information with relation to specific compositions of the invention and methods of their preparation and mode of use are given hereinafter.

The compositions of the present invention demonstrate the unequivocally superior adjuvant activity of the present alginate preparations, eliciting antibody response to antigen far greater than has hitherto resulted with any conventionally used adjuvants. Experiments performed and their results follow, it being understood that the examples herein are given by way of illustration only and are not to be construed as limiting.

PREPARATIONS 1–4

(1) Freund's adjuvant was prepared by mixing two volumes of white mineral oil ("Bayol F") with one volume of a purified lanolin preparation ("Falba"). To this mixture was added an amount of heat-killed and lyophilized cells of M. tuberculosis variety hominis strain H37Ra to yield a final concentration in this suspension of two milligrams of cell material for each six milliliters of the mineral oil-lanolin mixture. This constituted the Freund's adjuvant.

(2) Alum-type adjuvant was prepared by mixing equal volumes of one percent aluminum ammonium sulphate and one percent ammonium hydroxide and permitting the precipitate to accumulate overnight at room temperature. The precipitate was then collected and repeatedly washed with distilled water until free of any ammonium ion. The precipitate thus freed of suspending fluid by centrifugation consists of a thick jelly which still can be pipetted.

(3) The sodium alginate adjuvant used was a non-sensitizing pyrogen-free four percent solution having a viscosity of approximately 20 centistokes, a pH value of between 7.2 and 7.6, and minimal amounts of lead (<1 p.p.m.), copper (1 p.p.m.), and arsenic (nil), a chemical equivalence between 188 and 200, a milliosmolarity (Fiske) per kgm. of water of 111.5, and showed only negligible absorption at or near 270 m$\mu$ and no absorption from 1000 to 400 m$\mu$.

(4) A suspension of Salmonella typhosa cells, in the 0 antigenic state, was prepared by inoculating brain-heart infusion agar slants with a culture of S. typhosa and, after eighteen hours incubation at 37° C. washing off the growth of the surface of the slants with normal saline. This suspension was transferred to a centrifuge tube where, after centrifugation, the supernatant was discarded and the cells resuspended in fresh saline. This washing operation with saline was repeated until the supernatant was clear. The cells were then again centrifuged and washed using distilled water for a total of three separate distilled water washes. The final cell suspension was then heat killed in a 60° C. water bath for one hour and cell numbers determined nephelometrically.

*Example 1*

(a) The cell suspension of S. typhosa was added to the Freund's adjuvant in a proportion of one volume of the cell suspension to three volumes of the adjuvant so that the final concentration of cells in this mixture was $8.0 \times 10^8$ cells per ml. One ml. of the cell suspension in the Freund's adjuvant was injected intramuscularly into 3-two kilogram rabbits. Each injection was made in the thigh muscle, the left and right legs being used alternately. These injections were made a total of three times in each animal, a week apart from each other, and the rabbits bled by cardiac puncture a week following the last injection.

(b) The vaccine of *S. typhosa* in the alum adjuvant was prepared by adding equal volumes of the final suspension of the cells to the gelatinous alum preparation so that the final concentration of cells in this mixture was $8.0 \times 10^8$ cells per ml. Three rabbits of approximately two kilogram weight were injected on the identical time schedule and using the same number of cells as used for the Freund's adjuvant. Bleeding was also accomplished in the same way.

(c) The suspension of *S. typhosa* cells in the sodium alginate adjuvant was accomplished by centrifuging a suspension of *S. typhosa* and discarding the supernatant, thus leaving a compressed pellet of the cells. The 4% sodium alginate solution was then added to the cell pellet so that each milliliter of this alginate suspension would contain $8.0 \times 10^8$ cells per ml. The injection schedule and other details of injection and bleeding of the rabbits were exactly as indicated above for the Freund's and alum adjuvants.

(d) A fourth group of 3-two kilogram rabbits was injected with $8.0 \times 10^8$ cells of *S. typhosa* suspended in distilled water using the same time schedule and same bleeding of animals as indicated for the above three adjuvants. This group constituted the control group in which no adjuvants were used.

*Results.*—Titers on the serum prepared from the blood of all of the above animals were determined by serially diluting 0.5 ml. of the serum with 0.5 ml. of saline using conventional methods, and adding to each of these solutions 0.5 ml. of the suspension of *S. typhosa* constituting $1.8 \times 10^9$ cells per ml. The tubes were then incubated at 37° C. for two hours and then transferred to a 4° C. incubator for approximately eighteen hours. The agglutination end-point was determined by reading the tubes after they had been centrifuged at 1500 r.p.m. for three minutes. Reading of titer is carried out by lightly tapping the bottom of the tube to observe the physical character of the sediment of bacteria as they begin to rise up from the pellet. Positive agglutination was read when clearly discernible aggregates were found. The titers for these four groups of animals are as indicated in Table I.

TABLE I.—ANTIBODY RESPONSE TO *S. TYPHOSA* WITH SEVERAL ADJUVANTS

| Rabbit No. | Adjuvant | Titer | Mean titer |
| --- | --- | --- | --- |
| TA 13 | Freund's | 1:64 | |
| TA 19 | do | 1:128 | 1:106 |
| TA 75 | do | 1:128 | |
| TB 59 | No adjuvant | 1:4 | |
| TB 64 | do | 1:8 | 1:6 |
| B 95 | do | 1:8 | |
| TC 65 | Alum | 1:16 | |
| TC 74 | do | 1:16 | 1:21 |
| TC 47 | do | 1:32 | |
| TD 26 | Sodium alginate | 1:256 | |
| TD 35 | do | 1:512 | 1:426 |
| TD 4 | do | 1:512 | |

The average titer for the three animals injected with *S. typhosa* cells suspended in the alum adjuvant is approximately three to four times as great as the antibody titer found where no adjuvant is used at all. It is also clear and consistent with the previous experience of the medical and immunological professions that, except for the sodium alginate adjuvant, the Freund's adjuvant is superior to the alum adjuvant giving rise to an antibody titer approximately five times as great as that found using the alum adjuvant. It is particularly significant that the average antibody titer with the sodium alginate adjuvant is approximately four times as great as that found with the Freund's adjuvant and approximately 21 times as great as that found with the alum adjuvant.

PREPARATION 5

It was considered unlikely that sufficient calcium ions would be present in the tissues of the animals to precipitate all of the sodium alginate as the calcium salt. This conclusion is supported by titration experiments in order to determine the concentrations of calcium ion necessary to precipitate 2% and 4% weight/volume solutions of sodium alginate.

Table II indicates that gelation of 4% sodium alginate diluted to 2% either with distilled water or physiological saline, and of the undiluted 4% sodium alginate, takes place between 35 and 55 milli-equivalents of $Ca^{++}$ ions as $CaCl_2$ when the $Ca^{++}$ solutions are added in a proportion of 1:1.

TABLE II.—TITRATION OF Na ALGINATE WITH $CaCl_2$
[Solutions in columns A, B, and C added to $Ca^{++}$ solutions in equal amounts (1 ml. to 1 ml.)]

| $CaCl_2$ (meq. $Ca^{++}$) | (A) 4% Na alginate plus dist. $H_2O$ (1:1) (final conc. equals 2%) | (B) 4% Na alginate plus Saline (1:1) (final conc. equals 2%) | (C) 4% Na alginate (undiluted) |
| --- | --- | --- | --- |
| 100 | + | + | + |
| 90 | + | + | + |
| 80 | + | + | + |
| 70 | + | + | + |
| 60 | + | + | + |
| 55 | + | + | ± |
| 50 | + | + | − |
| 45 | + | + | − |
| 40 | ± | + | − |
| 35 | − | ± | − |
| 30 | − | − | − |
| 20 | − | − | − |
| 10 | − | − | − |
| 5 | − | − | − |

NOTE.—+ equals formation of gel, − equals no formation of gel.

*Example 2*

In order to depot a larger amount of *S. typhosa* vaccine with the calcium alginate, the following experiment was performed in which calcium chloride solution was injected immediately after the injection of the *typhosa* vaccine suspended in the sodium alginate adjuvant.

Three rabbits were used and the same injection schedule and conditions of bleeding were followed as used in the experiments with the adjuvants reported in Example 1. Each injection again constituted $8.0\times10^8$ cells per ml, and in each case one ml. of the *typhosa* vaccine suspended in 4% sodium alginate was injected intramuscularly. The needle was left in situ and the syringe removed and replaced by a syringe containing a calcium chloride solution having a concentration of 75 milliequivalents calcium, one ml. of which was then injected.

Table III gives the serum titers that were found on the three animals. The titers found in this case were extremely significant and markedly higher than what has been previously shown with any other adjuvant (see Table I) and nearly three times as high as that realized with the sodium alginate adjuvant where no calcium chloride was used.

TABLE III.—RABBITS INJECTED WITH *S. TYPHOSA* VACCINE IN 4% SODIUM ALGINATE ADJUVANT FOLLOWED BY $CaCl_2$ INJECTION IN SITU

| Rabbit No. | Titer | Mean |
|---|---|---|
| 1 | 1:1024 | 1:2389 |
| 2 | 1:4096 | |
| 3 | 1:2048 | |

*Example 3*

Parallel experiments were conducted in rabbits inoculated on the one hand with a vaccine suspension of poliomyelitis strain No. 2 embodying Freund's adjuvant and on the other hand with the same strain suspended in the 4% solution of sodium alginate employed in Example 1.

Comparative results of antibody titer were obtained by tissue culture of HeLa cells at varying dilutions of equivalent sera samples, reading antibody titer in terms of dilution which produced effective inhibition, results being considered to show positive inhibition at a fifty percent reduction in plaque count.

The mean blood sample dilutions at which positive inhibition were obtained were as follows:

Vaccine:
    Embodying Freund's adjuvant _____ 1:400
    Embodying Sodium Alginate adjuvant ____ 1:2000

The sodium alginate adjuvant was thus shown to be at least five times as effective as Freund's adjuvant in increasing the antibody titer produced by the tested poliomyelitis vaccine.

*Example 4*

Among other vaccine and antigen compositions, innumerable of which are presently available, documented in the literature, and hereby incorporated by reference, whether involving killed or attenuated or living microorganisms or organic antigens, the effectiveness of which in producing antibody titers is greatly enhanced by administration in compositions of the invention containing one to five percent by weight of the alginate adjuvants in the manner fully described in the foregoing may be mentioned:

Vaccines: smallpox, yellow fever, distemper, hog cholera, fowl pox, antivenom (e.g., latrodectus mactans, crotalidae), scarlet fever, diphtheria toxoid, tetanus toxoid, pigeon pox, whooping cough (*H. pertussis* vaccines), single or multiple influenzae, rabies, antihemophilus influenzae serum, mumps, measles, poliomyelitis globulin (serum or immune), Newcastle's disease, other bacterial, viral and rickettsial vaccines, and the like.

Antigens: ragweed pollen antigens, other pollen, e.g., hay fever pollen, antigens, tuberculin antigen, mumps antigen, dust antigen, milk antigen, or fractions, components, degradation and hydrolysis products of microorganisms, and any other allergenic products. In the allergy field, protective or desensitizing antibodies are usually produced upon injection of antigens.

*Example 5*

A soluble antigen consisting of 50 milligrams of electrophoretically homogeneous human gamma globulin was dissolved in the 4% sodium alginate adjuvant used in the previous examples. This composition was injected intramuscularly into rabbits in three equal one milliliter doses, one week apart. The rabbits were bled a week after the last injection.

Other groups of rabbits were injected with the same amount and with the same injection schedule combined with Freund's adjuvant, alum adjuvant, and a control group maintained in which no adjuvant was used. The data showing the antibody titers of these groups is shown in Table IV.

TABLE IV.—ANTIBODY RESPONSE TO HUMAN GAMMA GLOBULIN WITH ADJUVANTS

| Rabbit No. | Adjuvant | Antibody nitrogen/ml. of serum in micrograms | Mean titer |
| --- | --- | --- | --- |
| HE 28 | Freund's | 129 | |
| HE 46 | do | 73 | 106 |
| HE 44 | do | 118 | |
| HF 25 | No adjuvant | 5 | |
| HF 70 | do | 3 | 6 |
| HF 87 | do | 12 | |
| HG 29 | Alum | 56 | |
| HG 82 | do | 51 | 49 |
| HG 92 | do | 41 | |
| HH 16 | Sodium alginate | 25 | |
| HH 60 | do | 9 | 18 |
| HH 14 | do | 21 | |

It is clear that the sodium alginate adjuvant was not more effective than alum in eliciting an antibody response in this series of experiments. However, it was considerably more effective than the control group injected with no adjuvant.

The injection of calcium chloride solution in situ as described in Example 2 following injection of the sodium alginate-human gamma globulin composition, however, elicits a significantly greater antibody response than is found with conventional adjuvants. The same results and superiority obtain upon injection when sequestered calcium ions are embodied in the sodium alginate-human gamma globulin composition according to Example 6.

*Example 6*

Calcium ions may also be added to the sodium alginate solution in a sequestered form so as not to precipitate calcium alginate gel. Thus ethylenediamine tetracetic acid (EDTA) reacts with most metallic ions to form soluble, nonionic chelate compounds. Calcium chloride solution when mixed with EDTA forms a soluble product which will not cause precipitation of calcium alginate when such sequestered calcium ions are added to the sodium alginate solution. The composition of the sodium alginate-sequestered calcium chloride-antigen or vaccine mixture is then readily introduced parenterally (intradermally, subcutaneously, or intramuscularly). The action of the body tissues and fluids results in disassociation of the sequestered calcium, thus making it ionically available for reaction with the sodium alginate and resulting in the desired depoting of the vaccine or antigen without the necessity of a second injection for this purpose. The vaccines or antigens thus administered may be either particulate or non-particulate. Other physiologically acceptable sequestering agents may obviously be substituted for the EDTA.

Various modification may be made in the compositions of the invention and in the processes of making and using the same without departing from the spirit or scope of the invention, as such modifications and substitutions of equivalent materials, steps, conditions and other protocol as herein described will immediately be apparent to one skilled in the art to which this invention relates, wherefore the invention is to be limited only by the scope of the appended claims.

We claim:
1. A method of producing a medicament composition, selected from the group consisting of vaccine and antigen compositions, suitable for parenteral injection intramuscularly, intradermally, and intracutaneously into a living animal body, to produce antibodies in said body, which includes the step of
    (A) mixing (1) a material selected from the group consisting of vaccines and antigens, (2) a soluble alginate having the following characteristics:
        (a) In 5% weight/volume aqueous solution, readily passes a 24 gauge needle.
        (b) In 4% weight/volume aqueous solution, has a viscosity less than 50 centistokes.
        (c) A chemical equivalence below 250.
        (d) A milliosmolarity less than 150 per kg. of water on a Fiske osmometer.
    and (3) sterile aqueous medium,
    (B) effecting a concentration of soluble alginate of about one to five weight/volume percent, and
    (C) maintaining the concentration of unsequestered alginate insolubilizing ions below that concentration required to form insoluble alginate gel sufficient to interfere with ultimate use of the product, thereby to produce an injectable composition suitable for the aforesaid purpose.

2. Method of claim 1, wherein the soluble alginate is in the form of a one to five percent weight/volume sterile aqueous solution.

3. Method of claim 1, wherein the soluble alginate is sodium alginate having the following characteristics:
  (a) In 4% weight/volume aqueous solution, readily passes a 24 gauge needle.
  (b) In 4% weight/volume aqueous solution, has a viscosity of 20 or less centistokes.
  (c) pH in 4% solution between about 7.2 and 7.6.
  (d) A chemical equivalence between about 188 and 220.
  (e) A millismolarity on a Fiske osmometer of about 111.5.
  (f) No absorption peaks on a Beckman DK-2 recording spectrophotometer in the range of 1000 to 400 m$\mu$ and only negligible absorption at 270 m$\mu$ in the range 200 to 400 m$\mu$.

4. Method of claim 1, wherein the soluble alginate is sodium alginate in the form of an approximately four percent sterile aqueous solution.

5. Method of claim 1, wherein alginate insolubilizing ions are included in the composition in the form of a physiologically acceptable metallic salt selected from the group consisting of chlorides, carbonates, lactates, citrates, gluconates, acetates, and propionates.

6. Method of claim 1, wherein alginate insolubilizing ions are included in the composition in the form of a physiologically acceptable metallic gluconate.

7. Method of claim 1, wherein alginate insolubilizing ions are included in the composition in a sequestered physiologically acceptable form.

8. Method of claim 7, wherein the active principle of the medicament is non-particulate.

9. Method of claim 7, wherein the sequestering agent is ethylene diamine tetraacetic acid.

10. Method of claim 7, wherein the alginate insolubilizing ions are calcium ions.

11. A medicament composition, selected from the group consisting of vaccine and antigen compositions, suitable for parenteral injection intramuscularly, intradermally, and intracutaneously into a living animal body to produce antibodies in said body, comprising (1) a material selected from the group consisting of vaccines and antigens, (2) a soluble alginate having the following characteristics:
  (a) In 5% weight/volume aqueous solution, readily passes a 24 gauge needle.
  (b) In 4% weight/volume aqueous solution, has a viscosity less than 50 centistokes.
  (c) A chemical equivalence below 250.
  (d) A milliosmolarity less than 150 per kg. of water on a Fiske osmometer.
and (3) sterile aqueous medium, the concentration of soluble alginate in said composition being about one to five weight/volume percent, the concentration of unsequestered alginate insolubilizing ions in said composition being below that concentration required to form insoluble alginate gel sufficient to interfere with ultimate use of the product as an injectable composition.

12. A composition of claim 11, wherein the soluble alginate is sodium alginate having the following characteristics:
  (a) In 4% weight/volume aqueous solution, readily passes a 24 gauge needle.
  (b) In 4% weight/volume aqueous solution, has a viscosity of 20 or less centistokes.
  (c) pH in 4% solution between about 7.2 and 7.6.
  (d) A chemical equivalence between about 188 and 220.
  (e) A milliosmolarity on a Fiske osmometer of about 111.5.
  (f) No absorption peaks on a Beckman DK-2 recording spectrophotometer in the range of 1000 to 400 m$\mu$ and only negligible absorption at 270 m$\mu$ in the range 200 to 400 m$\mu$.

13. A composition of claim 11, wherein the sodium alginate is present in a concentration of about four percent weight/volume.

14. A composition of claim 11, wherein alginate insolubilizing ions are also present in the form of a physiologically acceptable metallic salt selected from the group consisting of chlorides, carbonates, lactates, citrates, gluconates, acetates, and propionates.

15. A composition of claim 11, wherein alginate insolubilizing ions are also present in the form of a physiologically acceptable metallic gluconate.

16. A composition of claim 11, wherein alginate insolubilizing ions are also present in a sequestered physiologically acceptable form.

17. A composition of claim 16, wherein the active principle of the medicament is non-particulate.

18. A composition of claim 16, wherein the sequestering agent is ethylene diamine tetraacetic acid.

19. A composition of claim 16, wherein the sequestered alginate insolubilizing ions are calcium ions.

20. In a method for the parenteral administration of a medicament selected from the group consisting of vaccines and antigens into a living animal body to produce antibodies in said body, the step of injecting said medicament by a parenteral route selected from the group consisting of intramuscular, intradermal, and subcutaneous routes together with a physiologically acceptable adjuvant which is a one to five percent weight/volume aqueous solution of a soluble alginate having the following characteristics:
  (a) In 5% weight/volume aqueous solution, readily passes a 24 gauge needle.
  (b) In 4% weight/volume aqueous solution, has a viscosity less than 50 centistokes.
  (c) A chemical equivalence below 250.
  (d) A milliosmolarity less than 150 per kg. of water on a Fiske osmometer.

21. The method of claim 20, wherein the medicament and adjuvant are combined and injected as one composition.

22. The method of claim 21, wherein the adjuvant is an approximately four percent weight/volume aqueous solution of sodium alginate having the following characteristics:
  (a) In 4% weight/volume aqueous solution, readily passes a 24 gauge needle.
  (b) In 4% weight/volume aqueous solution, has a viscosity of 20 or less centistokes.
  (c) pH in 4% solution between about 7.2 and 7.6.
  (d) A chemical equivalence between about 188 and 220.
  (e) A milliosmolarity on a Fiske osmometer of about 111.5.
  (f) No absorption peaks on a Beckman DK-2 recording spectrophotometer in the range of 1000 to 400 m$\mu$ and only negligible absorption at 270 m$\mu$ in the range 200 to 400 m$\mu$.

23. The method of claim 20, wherein physiologically acceptable alginate insolubilizing ions in addition to those normally indigenous to the animal body are provided in the animal body in the area of the injection site.

24. The method of claim 23, wherein physiologically acceptable alginate insolubilizing ions are provided in the form of a metallic salt selected from the group consisting of chlorides, carbonates, lactates, citrates, gluconates, acetates, and propionates.

25. The method of claim 23, wherein physiologically acceptable alginate insolubilizing ions are provided in the form of a metallic gluconate.

26. The method of claim 23, wherein the active principle of the medicament is non-particulate.

27. The method of claim 23, wherein the added alginate insolubilizing ions are provided by injection of a physiologically acceptable alginate precipitant.

28. The method of claim 23, wherein the alginate insolubilizing ions provided are calcium ions.

29. The method of claim 23, wherein the alginate insolubilizing ions are provided in the form of physiologically acceptable sequested ions which become unsequestered in the living animal body.

30. The method of claim 29, wherein the sequestering agent is ethylene diamine tetraacetic acid.

References Cited in the file of this patent

Slavin: "Production of Antisera in Ribbits Using Calcium Alginate as an Antigen Depot," Nature, vol. 165, No. 4186, pp. 115–116 (1950).

Glynn et al.: "The Production of Complete Antigens From Polysaccharide Haptens by Streptococci and Other Organisms," J. Pathol. Bacteriol., vol. 64, pp. 775–783 (1952).

Hijmans et al.: "Failure to Increase Production of Antibody Against Dextran and Alginate Adsorbed on Streptococci by Changing the Streptococcal Type During Immunization," J. Pathol. Bacteriol., vol. 73, pp. 268–269 (1957).

Amies: "The Use of Topically Formed Calcium Alginate as a Depot Substance in Active Immunization," J. Pathol. Bacteriol., vol. 77, pp. 435–442 (1959).

UNITED STATES PATENT OFFICE
CERTIFICATE OF CORRECTION

Patent No. 3,075,883                           January 29, 1963

George H. Scherr et al.

It is hereby certified that error appears in the above numbered patent requiring correction and that the said Letters Patent should read as corrected below.

In the heading to the printed specification, line 2, in the title of invention, after "VACCINE" insert -- AND --; column 2, line 24, for "or" read -- of --; line 51, for "(Burkyl)" read -- (Burky) --; column 3, line 52, for "be" read -- he --; column 4, line 22, for "weight-volume" read -- weight/volume --; column 6, line 13, for "alsot" read -- also --; column 7, line 50, for "alignate" read -- alginate --; line 68, for "squestered" read -- sequestered --; column 9, Table I, column 1, line 6 thereof, for "B 95" read -- TB 95 --; column 10, line 38, for "NOTE.-+ equals" read -- NOTE. + equals --; column 13, line 10, for "millismolarity" read -- milliosmolarity --; line 34, for "alignate" read -- alginate --; column 15, line 9, for "Ribbits" read -- Rabbits --.

Signed and sealed this 3rd day of September 1963.

(SEAL)
Attest:
ERNEST W. SWIDER                                      DAVID L. LADD
Attesting Officer                                        Commissioner of Patents